Dec. 8, 1936.  R. H. JOHNSON  2,063,506
FINENESS MODULUS INDICATOR
Filed March 6, 1933
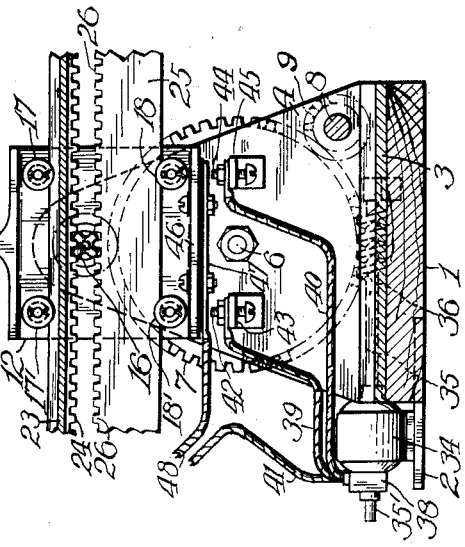
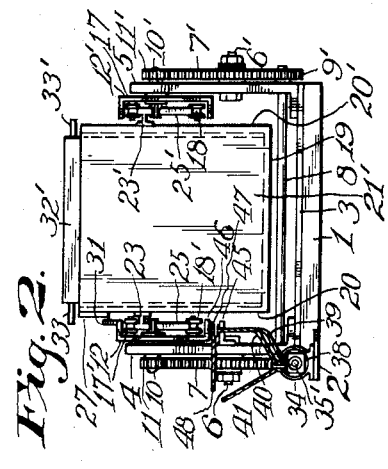
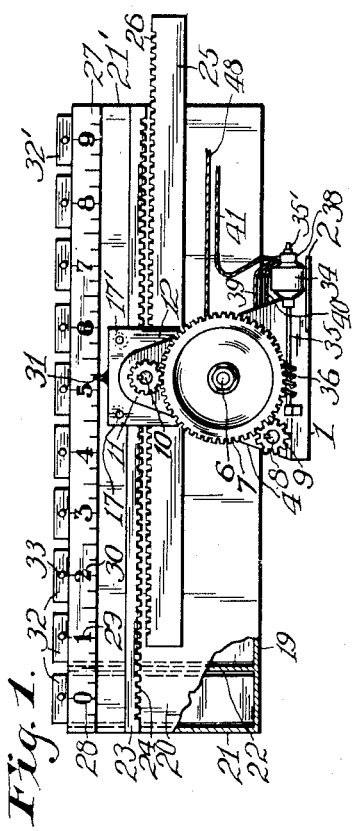
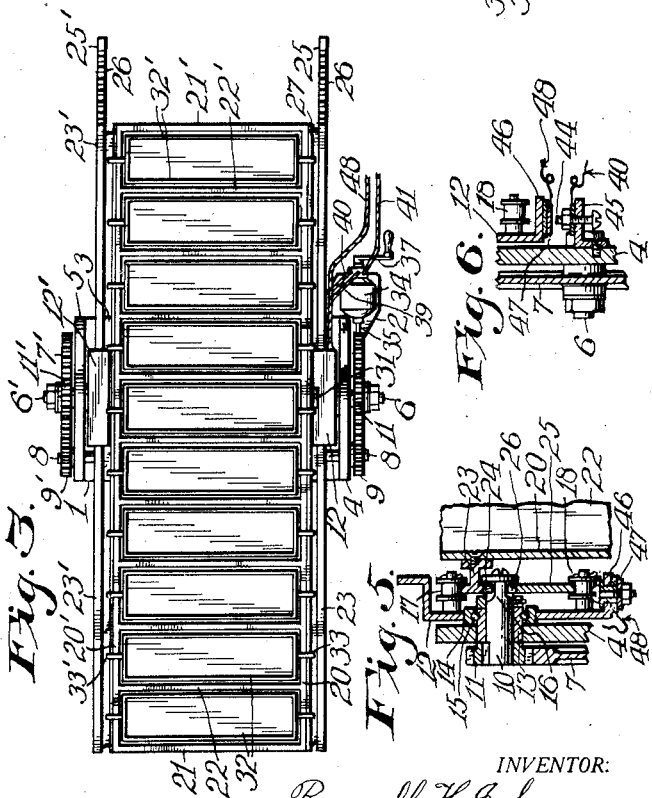
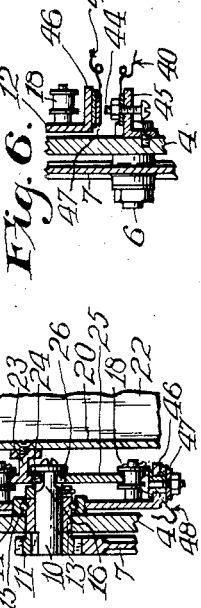
INVENTOR:
Russell H. Johnson,
BY
E. T. Silvius,
ATTORNEY.

Patented Dec. 8, 1936

2,063,506

UNITED STATES PATENT OFFICE 2,063,506

FINENESS MODULUS INDICATOR

Russell H. Johnson, Indianapolis, Ind.

Application March 6, 1933, Serial No. 659,901

6 Claims. (Cl. 265—35)

This invention relates to apparatus for indicating the fineness modulus of concrete aggregates in conjunction with sieve analyses and based on the definition by Bulletin #1, Structural Materials Research Laboratory, Lewis Institute, Chicago, entitled "Design of concrete mixtures" by Duff A. Abrams, professor in charge of laboratory, and published by the Structural Materials Research Laboratory, first printing, December 1918, revised edition December 1925. The invention has reference more particularly to a device by which the fineness modulus of an aggregate is indicated by establishing an equilibrium or balance after the material retained on the separate sieves in sieve analyses is deposited into corresponding containers on the device and without weighing the material retained on the 1.5″, .742″, .371″, #4, #8, #14, #28, #48, #100 and passing #100 sieves of the Tyler standard screen scale testing sieves or equivalent; without calculating the percentages retained or coarser than each sieve; without adding these percentages and without dividing this total by 100, all as is now done to yield the fineness modulus of the sample sieved.

An object of the invention is to provide a fineness modulus indicator which shall be of such construction as to be adapted for advantageous use by field engineers, concrete aggregate producers, testing laboratories, and by those interested in grading of aggregates and the determination of proportions for concrete or mortar mixes, or what is known as design of concrete mixtures, and in an inexpensive, expeditious, accurate and time-saving manner, and which indicator may be provided at moderate cost.

Another object is to provide a fineness modulus indicator which shall be so constructed as to be adapted to obviate tedious calculations and observations of weights and eliminate arithmetical calculations subsequent to sieving operations and part of the present method of fineness modulus determination.

A further object is to provide indicating apparatus of such construction as to be suitable for use for various purposes, and having wide adaptability in practical application, and which shall not be likely to become deranged but will be durable and economical in use.

With the above-mentioned and other objects in view, the invention consists in a novel fineness modulus indicator and in novel features thereof, and in the parts and combinations and arrangements of parts, as hereinafter particularly described and definitely claimed.

Referring to the accompanying drawing, Figure 1 is a side elevation of the preferred form of structure of an indicator embodying the invention of an automatic type; Fig. 2 is an end elevation of the indicator; Fig. 3 is a top plan of the indicator; Fig. 4 is a fragmentary vertical longitudinal section showing details of the indicator on an enlarged scale; and Figs. 5 and 6 are fragmentary sectional details on different transverse planes showing different features of structure on enlarged scales embodied in the preferred form of structure.

Similar reference characters in the various figures of the drawing indicate corresponding elements or features of construction herein referred to in detail.

In the drawing, the indicator structure is shown as having a horizontal base 1 which has an extension plate 2 at the bottom of one corner thereof, and the base has also a tie plate 3 fixed on its top which supports two spaced apart vertical side frame parts 4 and 5 provided with stationary axle studs 6 and 6', respectively, on which toothed gear wheels 7 and 7' are rotatively supported respectively. The side parts rotatively support a transmission shaft 8 to which is secured a pinion 9 meshing with the wheel 7 and driven thereby, and a pinion 9' meshing with a driving wheel 7'. Above the wheel 7 a pinion shaft 10 is suitably supported rotatably by the part 4 and has a pinion 11 fixed thereto and meshing with the wheel 7; and similarly a corresponding shaft 10' is rotatively supported by the frame part 5 and has a pinion 11' fixed thereto and meshing with the gear wheel 7'. Adjacent to the inner sides of the frame parts 4 and 5 a pair of guide boxings 12 and 12' are arranged and have pivotal support on the pinion shafts 10, 10', a suitable support for each comprising a cone member 13 secured to the shaft and supported in an adjacent frame part, a bearing ring 14 secured in the boxing and directly supported by bearing balls 15, the shaft having pinion teeth 16 adjacent to its inner end. Each boxing has upper guide rollers 17, 17' mounted thereon and also lower guide rollers 18, 18' similarly mounted thereon. A holder is provided comprising a bottom member 19, side walls 20 and 20', end walls 21 and 21', and partitions 22, 22' joined to the side walls. Rack bars 23 and 23' are appropriately secured horizontally to the side walls respectively, each having gear teeth 24 on its under portion and supported by the shaft 10 and 10' in engagement with the pinion teeth 16 whereby the holder is longitudinally moved with the rack-bars in connection with the upper guide rollers. Two counter-balance bars 25 and 25′ are movably arranged in the boxings respectively and supported on the lower rollers 18 and 18′, each bar having gear teeth 26 in engagement with the pinion teeth 16 so as to be shifted longitudinally in the direction opposite to that moved by the holder. The upper portion of one of the side walls of the holder has a horizontal indicator plate 27 fixed thereon and it has indicating characters 28, 29, 30, and other numerically progressive characters to determine relative positions of containers in the holder to be ascertained by observation of the positions of the indicator characters in relation to a pointer 31 fixed on the top of the boxing 12. The indicator character 28 represents "zero" and the compartment adjacent to one end of the holder, and the remaining characters and compartments are spaced equi-distantly apart, a convenient spacing in practice being 2½ inches apart, 10 compartments being a suitable number in the holder to receive an equal number of containers 32 and 32′ and others between them, each container having handles 33 and 33′ accessible above the top of the holder and which are adapted to constitute trunnions when desired. The containers are alike in size and weight, each suitably of one-tenth cubic foot capacity, and are removably arranged in the compartments between the partitions in the holder, the containers suitably being rectangular and without covers to facilitate the handling or changing of positions in the holder.

Automatic control of movements of the holder is obtained by means of a reversing electric motor 34 suitably mounted on the base 1 so that its armature shaft 35 extends to a suitable point and carries an appropriate gear 36 in connection with the toothed wheel 7, the shaft having an extension 35′ to which a crank 37 may be connected for temporary hand operation if desired. The motor may have a suitable casing 38 for the accommodation of electric wiring for a D. C. system of electric energy. Two conducting wires or cables 39 and 40 and a grounding circuit wire 41 extend into the casing 38. The conducting wire 39 is provided with a contact point 42 adjustably supported by a bracket 43 secured to the frame part 4 and the conducting wire 40 is provided with a contact point 44 which is adjustably supported on a bracket 45 secured also to the frame part 4, the contact point being spaced a suitable distance apart and appropriately insulated electrically from the frame part. The part 12 has a member 46 rigid thereon a suitable distance above contact points and carries a switch bar 47 insulated therefrom and is tiltable to either one of the contact points to conduct current thereto from a lead wire 48 having connection with the switch bar 47 from a suitable source of electric current.

In practical use, the preferred construction of the device is adaptable to the purposes of the invention and too, to use in the observations for fineness or grading of any materials subjected to sieve analyses and subsequent thereto. Such materials in addition to concrete aggregates, include ores or minerals found in nature and reduced in size by rolls, pulverizers or crushers; also finely divided materials of the manufactured classification such as cement or chemicals. The device, by its mechanical operations will give an index or criterion of the fineness of any material capable of a screen or sieve test, in which are used accepted standardized wire cloth screens, such as are found in the Tyler standard screen scale testing sieve having a fixed known relation of clear screen opening between wires, which results in the separation of any finely divided material into several lots of particles of graded sizes. The degree of separation desired varies with sieve analyses by different men of different materials and for different purposes.

As an explanation of the manner in which the specific embodiment of my invention shown in the drawing functions, consider a batch of aggregate divided into ten fractions of varying fineness by a set of nine graduated sieves, letting "$a$" represent the percentage of the total quantity passing the finest sieve, "$b$" the percentage which is retained on the finest sieve and which passes the next coarser sieve and so on; "$j$" representing the percentage of the total quantity which is retained on the coarsest sieve of the set. Then (1) $\qquad a+b+c \ldots +i+j=100.$ The fineness modulus is defined as $$M=\frac{j+(i+j)+(h+i+j)\ldots+(b+c\ldots+j)}{100}$$

or, (2) $\qquad M=\dfrac{9j+8i+7h+6g+5f+4e+3d+2c+b}{100}$

The device of Figs. 1 to 6 obviously balances when the index 31 is in the same vertical plane with the center of gravity of the aggregate-fractions distributed in the containers 32. If the distance between the centers of adjacent containers is considered to be "$s$", the distance "$D$" between that center of gravity and the center of the container on the left, which contains the finest fraction, can be found from the following equation, which represents moments taken about the center of the container on the left:

(3) $\qquad 0.a+s.b+2s.c \ldots +9s.j=100D$

In this equation, no account is taken of the action of gravity on the parts of the device itself, since they are automatically disposed to balance at all times.

Substituting from Equation (2) in Equation (3) there is obtained the relation $$Ms=D$$

or (4) $\qquad M=\dfrac{D}{s}$

It is therefore apparent that if the unit graduations of the scale 27 are spaced at intervals "$s$", as is the case, the reading of the index 31 on the scale will correspond to the section modulus.

The preferred construction of the device by virtue of its automatic balancing operation, lends itself to purposes of operating, auxiliary recording and control devices, both as relates to a graphical record of continuous output from rolls, pulverizers and crushers, or flow of raw stock into bins and too, as relates to the control of fineness or grading of materials by the adjustment of rolls, pulverizers or crushers; also to the control of fineness or grading of material flowing to or from stock bins, by varying or adjusting a mixture, to yield a material of fixed and known fineness or fineness within certain limits.

What is claimed is:

1. A fineness modulus indicator including a frame having co-axial pinion shafts rotatably supported thereby, gearing mounted on the frame and controlling the shafts, a holder for containers arranged in the frame and having rack-bars fixed thereto and driven by the pinion shafts, said holder and rack bars being tiltable as a unit about the common axis of said shafts, guide boxings rotatively supported by the pinion shafts respectively and having rollers thereon guiding the rack-bars, a toothed balancing bar arranged in one of said boxings under and in connection with the adjacent pinion shaft and guided by the boxing, a reversible motor supported by the frame and having driving connection with the gearing, and means responsive to tilting movement of the holder for controlling said motor to balance the holder in a substantially horizontal position.

2. A fineness modulus indicator, comprising a base, a support pivotally mounted in said base on a horizontal axis, a frame, a plurality of containers located in predetermined horizontally spaced relation in said frame, said frame being horizontally slidable in said support to bring the center of gravity of the material in said containers into substantially the same vertical plane with the support-axis, and indicating means co-related with the spacing of said containers for indicating the relative position of said frame in said support.

3. The invention set forth in claim 2 with the addition of a counterbalancing member horizontally slidable in said support, and means for jointly moving said frame and counter-balancing member in opposite directions.

4. The invention set forth in claim 2 with the addition of a counterbalancing member horizontally slidable in said support.

5. A fineness modulus indicator, comprising a supporting frame, a member pivotally mounted in said frame on a substantially horizontal axis, a holder horizontally slidable in said frame, a scale and a cooperating index mounted one on the holder and the other on said member to indicate the relative horizontal positions of the holder and member, a series of containers mounted in spaced relation in the holder, a reversible motor, means driven by said motor for moving said holder in said member, and means responsive to tilting movement of the holder for controlling said motor.

6. A fineness modulus indicator, comprising a supporting frame, a member pivotally mounted in said frame on a substantially horizontal axis, a holder horizontally slidable in said frame, a scale and a cooperating index mounted one on the holder and the other on said member to indicate the relative horizontal positions of the holder and member, a series of containers mounted in spaced relation in the holder, and means responsive to tilting movement of the holder for shifting the holder in said member to bring the holder to a position in which it is balanced about the axis of said member.

RUSSELL H. JOHNSON.